United States Patent [19]

Sell

[11] Patent Number: 5,172,958
[45] Date of Patent: Dec. 22, 1992

[54] AIR BRAKE CONTROL VALVE SYSTEM
[75] Inventor: Edward D. Sell, Iola, Kans.
[73] Assignee: Tramec Corporation, Iola, Kans.
[21] Appl. No.: 830,672
[22] Filed: Feb. 4, 1992
[51] Int. Cl.$^5$ ............................................. B60T 13/22
[52] U.S. Cl. ...................................... 303/9.76; 303/7; 303/9; 303/28; 303/71; 188/170
[58] Field of Search ....................... 303/7, 8, 9, 13–14, 303/71, 9.76, 28–30; 188/170

[56] References Cited
U.S. PATENT DOCUMENTS
4,593,954 6/1986 Campanini .
4,629,256 12/1986 Fannin ............................ 303/9.76 X Primary Examiner—Douglas C. Butler
Attorney, Agent, or Firm—Dowell & Dowell

[57] ABSTRACT

An air brake control system for use in truck trailers, including tandem trailers, having at each axle compressed-air spring brakes and service brakes with each trailer being coupled to receive compressed air through an emergency (supply) gladhand and to receive service brake signals through a service (control) gladhand and which includes an integrated brake valve system for each trailer within a common valve housing. Each integrated brake control valve includes a spring brake valve cluster having a non-return check valve connected to receive and pass air pressure from the emergency supply and deliver it to the spring brakes and an air pressure responsive shuttle operative to open the check valve whenever the emergency supply line pressure falls below a predetermined spring brake isolation pressure above which the spring brake holding pressure is not affected by fluctuations of the emergency supply pressure; an air tank supply valve cluster connected between the emergency supply and a reservoir and operative to sense pressure in the emergency supply and to open at a spring brake threshold pressure above the predetermined spring brake isolation pressure to pass air to the reservoir and to close air passage to the reservoir to prevent supply line pressures from dropping below the threshold level during failure of the system elements; and a non-compounding valve cluster for releasing service brake pressure to atmosphere whenever, due to a loss of pressure in the emergency supply lines, the spring brakes have been activated.

11 Claims, 6 Drawing Sheets

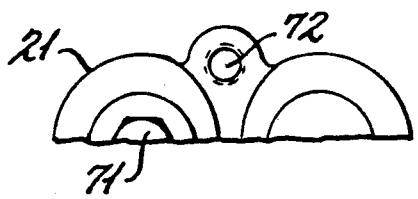
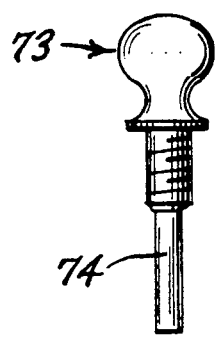
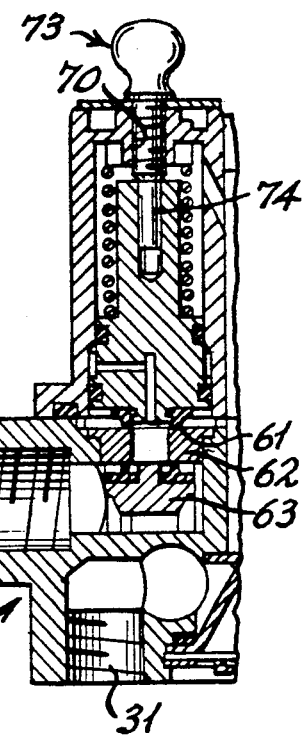
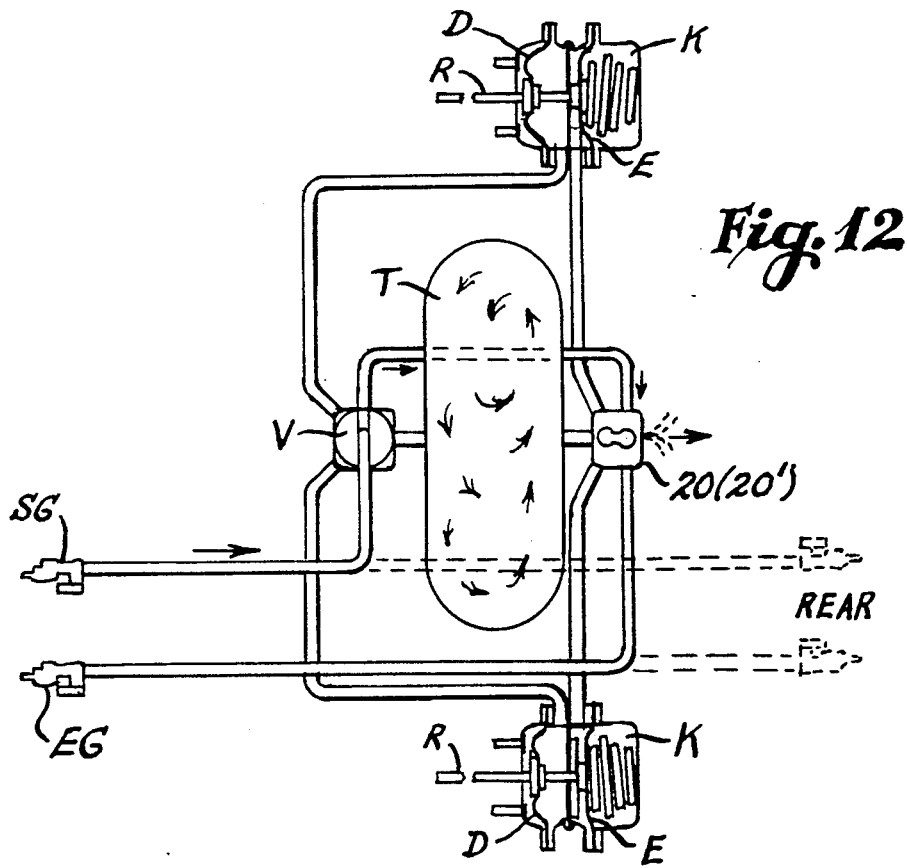

AIR BRAKE CONTROL VALVE SYSTEM

BACKGROUND OF THE INVENTION

1. Field of the Invention

This invention relates to improvements in air brake control systems for controlling the braking functions of multi-axle heavy-duty vehicles, including tandemly towed vehicles, and, more particularly, relates to an improved modular system for use in connection in each axle of a trailer or trailers while being towed behind tractor vehicles.

2. History of the Related Art

This application is an improvement of the air brake valve system disclosed in U.S. Pat. No. 4,593,954 issued Jun. 10, 1986 to Sergio Campinini, the entire contents of which are incorporated herein by reference. The present control valve system is designed to provide trailer spring brake control as required by DOT (Department of Transportation) FMVSS No. 121 as modified by Docket No. 90-3, Notice 2. This notice eliminated the requirement for a "protected tank" for release of the spring brakes in an emergency situation. The notice also requires that no single leakage type failure in the service system such as a rupture of the service reservoir shall result in a supply line pressure falling below a threshold pressure of 70 psi. The regulations further require that the spring brakes shall provide no retardation force when the supply line pressure is 70 psi or greater.

The control valves of the present invention also retain maximum system pressures in the spring brake chambers until the supply line pressures fall to a predetermined isolation pressure below the threshold pressure, at which time the spring brakes exhaust to atmosphere and are thus applied. The isolation from line pressure prevents brake drag which could result from varying supply line pressures. The valves of the present invention also provide an integrated quick release function which will meet the three second parking brake requirements of DOT FMVSS 121 with either two or four spring brakes attached.

The control valves of the present invention also provide an anti-compounding function to prevent the dual application of the service brakes in addition to the parking brakes. A problem can occur in prior art anti-compounding systems wherein any service air pressure is conveyed through a twoway check valve arrangement to apply pressure to reduce the spring brake force to the same extent that service brake force is applied to the brake pedal by the vehicle driver. With such prior art systems, when the vehicle considered is the second trailer in a "doubles" or "tandem" rig, and the driver, when connecting the air lines, turns on the service line but connects and fails to turn on the supply line, a dangerous situation is created in the event the driver subsequently releases his parking brakes but is required to remain still with his service brakes applied for an extended time. In this condition, the current method of anti-compounding by sending service air to the spring brakes would charge the spring brakes and possibly the reservoir to whatever pressure was applied by the driver's foot pedal. This pressure might be adequate to release the parking brakes to a degree that would allow the vehicle to be driven away. If this should happen, without the supply line being turned on, the brakes could easily apply partial pressure to the point of starting a fire, wearing away the brake linings, or reducing available service braking below a safe level due to the lack of pressure in the service reservoir which would not have been properly supplied.

New DOT regulations require that the valves in such braking systems be designed to protect and maintain the supply line pressure at a level that will allow release of the spring brakes for quick removal of a disabled vehicle. During emergency situations, such as when an accident involves the disruption of the air supply to a trailer, the air pressure which has been employed to release the emergency brake system is lost and the brakes are automatically applied by spring pressure. The most common causes for disruption of the trailer air supply are damage to air connectors or the gladhands at the front of the trailer, damage to the air line from the connector to the supply reservoir, damage to the reservoir itself, failure of a brake chamber or of the supply in a hose. In each of these conditions, the brakes are automatically set by spring pressure preventing the vehicle from being moved without mechanically caging the springs by inserting a special tool into the brake chamber and retracting the spring by screwing a nut onto the tool. Such caging must be done on each brake chamber.

SUMMARY OF THE INVENTION

This invention provides within a single valve housing for single or tandem axle vehicles a novel combination of valves which mutually cooperate to provide the necessary emergency brake and service brake air reservoir replenishment and protection functions for air and spring brake systems. The system for each axle or pair of axles includes an air reservoir and three valve clusters integrated within the same valve housing. A first emergency/parking brake cluster provides a shuttle and valves which control the supply of pressure to the spring brakes to retain them "OFF" or to release pressure to allow application of the brakes. A second valve cluster comprises a shuttle and valves/seats which control the filling and protection of the air reservoir tank in such a manner that flow to the reservoir is terminated to preserve supply line pressures at a minimum threshold spring brake pressure of 70 psi, and retain reservoir pressure when in a parked (spring brakes "ON") mode. A third valve cluster incorporates a shuttle valve which is designed to eliminate the possibility of compounding of braking forces by the service brakes when the spring brakes have been applied.

Starting with a fully discharged system, as the pressure in the emergency (supply) gladhand line builds, while the pressure is still below a preselected threshold pressure, a low-pressure warning signal is given to the driver in a tractor cabin and the valves in the trailer cooperate to route all the air to charge the spring brake chambers while preventing air from going to the air reservoir. This will allow the quick release of the spring or parking brakes to be accomplished so that an emergency movement of the vehicle may be achieved. One of the valves within the first valve cluster normally isolates the spring brake system from the remainder of the trailer brake systems after supply pressures have reached a maximum and maintains the emergency chamber pressure at the highest level achieved during normal functioning of the braking system so that fluctuations of pressure in the remainder of the brake system affecting pressure in the emergency gladhand supply line cannot draw down the pressure in the spring brake chambers. However, a valve member in the first valve cluster continuously senses the pressure in the emergency line. If this pressure should fall below a spring brake isolation pressure (a pressure below which the spring brakes should be applied), selected at approximately 45 psi, a second valve opens to exhaust air from the spring brake chambers thereby allowing the spring brakes to be fully applied. Thus, the spring brakes are never drawn down by the remainder of the system except when the gladhand or supply line pressure goes below the spring brake isolation pressure of 45 psi.

The second valve cluster which serves to fill the reservoir uses a shuttle to maintain an air inlet valve closed until the air pressure in the emergency gladhand line, and thus the spring brakes, exceeds the threshold pressure of 75 ($\pm 5$) psi whereby all air initially introduced into the trailer emergency gladhand line first goes to the spring brakes so that they are immediately released. When the line pressure goes above the threshold pressure of 75 ($\pm 5$) psi, the inlet valve is opened by the shuttle and air is routed simultaneously to the reservoir until the reservoir is filled or the supply line system achieves its maximum operating pressure of approximately 125 psi. A second valve in the second cluster serves as a check valve so that there can be no reverse flow of pressure through the second valve cluster to the supply inlet.

The shuttle of the second valve cluster is also designed to minimize hysteresis during its opening and closing. The shuttle or piston of the valve assembly includes a counter balancing flange which is oriented between two O-rings and communicate with the lower face of the shuttle through a bore. The shuttle is normally urged into a seated engagement with an opposing valve seat by spring pressure. However, when the pressure exceeds the threshold pressure of 75 ($\pm 5$) psi, the shuttle is lifted from the valve seat against the spring pressure. Simultaneously the counter balancing flange will be exposed, together with the base of the shuttle, to the supply line pressure. Once the face of the piston has been raised against the spring pressure, the surface area over which the supply pressure is applied is increased. In this manner, the stepped diameter of the piston provides a countering force to assist a spring in reseating the valve assembly when the supply pressure begins falling.

The third valve cluster incorporates a shuttle which is designed to eliminate the possibility of compounding of forces due to the simultaneous application of the spring brakes and service brakes. With the present invention, the third valve cluster includes a valve which prevents any loss of service signal whenever the supply pressure is delivered at the levels required by statute, or 85 psi, by urging the valve shuttle to close against a seal and valve seat. If no supply pressure is present to hold the shuttle against the seat, the service connection will be exhausted to atmosphere so that no pressure may be exerted by the service brake while the spring or parking brakes are applied.

In an alternate embodiment of the present invention, the first valve cluster includes a shuttle housing in which a check valve is positioned. The shuttle housing is designed to provide a configuration that will employ a differential area which is greater along the supply side of the housing to overcome a much higher pressure exerted against a smaller area on the spring brake side of the housing to thereby retain the maximum supply line pressure delivered to the spring brakes by closing the check valve into seated position within the housing until such time as the supply line pressure drops sufficiently to be counteracted by the high pressure applied to the spring brake side of the shuttle housing. As previously discussed, the areas between the upper and lower portions of the housing allow the housing to open to exhaust the spring brakes to atmosphere when the supply line pressure drops to the spring brake isolation pressure of approximately 45 psi. Such a system is not dependent upon the functioning of a calibrated spring as is the case with prior art systems and thus functions in direct response to the pressures within the system.

In yet another embodiment of the present invention, the shuttle valve of the second valve cluster which regulates the supply of air to the reservoir may be mechanically controlled by inserting a separately attached mechanical fastener which is readily received through the housing of the valve assembly and which is engageable with and urges the shuttle valve into sealed engagement with its corresponding valve seat thereby preventing any supply of air to the reservoir. Thereafter, the trailer emergency supply line may be disconnected from the control valve assembly so that an external source of emergency air such as from a towing vehicle may be connected so as to direct air to the spring brakes thereby releasing the brakes and allowing emergency towing of the vehicle.

It is a primary object of the present invention to provide a braking control valve for tractor trailer systems including "tandem" or "doubles" rigs which requires only one air reservoir and one valve housing per trailer axle or pair of axles and wherein the valve housing includes three valve clusters for regulating service and supply air to ensure maximum air pressure being delivered to the spring brakes, to allow filling of the system reservoir during normal functioning of the air brake system, to release the air pressure in the spring brake system when pressures in the supply system drop below an isolation pressure of 45 psi, and to prevent compounding in the brake system by venting service air to atmosphere when the spring brakes are applied.

It is a further object of the present invention to provide an improved braking system incorporating a single housing having a plurality of valve clusters therein wherein some of the valve clusters include a piston or shuttle which is so configured so as to allow air pressure on opposite sides of the shuttle to regulate or control the opening and closing of the valves so as to reduce reliance of the operation of the valves on mechanical devices such as springs and to reduce hysteresis during opening and closing of spring biased valves.

It is yet a further object of the present invention to provide a mechanical override for use with an improved braking valve system which regulates the supply of service and supply air to the brakes of a trailer by providing means for quickly releasing the spring brakes once they have been applied during an emergency situation when the supply line pressure is lost so that a vehicle may be immediately moved and wherein a mechanical override functions to restrict any passage of pressure to the system reservoir during times when a supplemental pressure source is connected to the brake system by an emergency towing vehicle so that the supplemental source of pressure is directed immediately to the spring brakes.

BRIEF DESCRIPTION OF THE DRAWINGS

FIG. 4 is a partial top plan view of the control valve shown in FIG. 1 showing the supplemental chamber for receiving a mechanical locking device in accordance with the teachings of the present invention.

FIG. 5 is a front plan view of the mechanical locking device utilized to mechanically seat a valve shuttle associated with the second valve cluster of the present invention.

FIG. 6 is a partial cross-sectional view of the valve assembly of FIG. 2 showing the positioning of the mechanical locking device shown in FIG. 5.

FIG. 12 is a flow diagram showing the anti-compounding valve cluster of the control valve of the present invention as it is activated to exhaust the service control line to atmosphere upon the application of the spring brake.

DESCRIPTION OF THE PREFERRED EMBODIMENT

Figure 1:
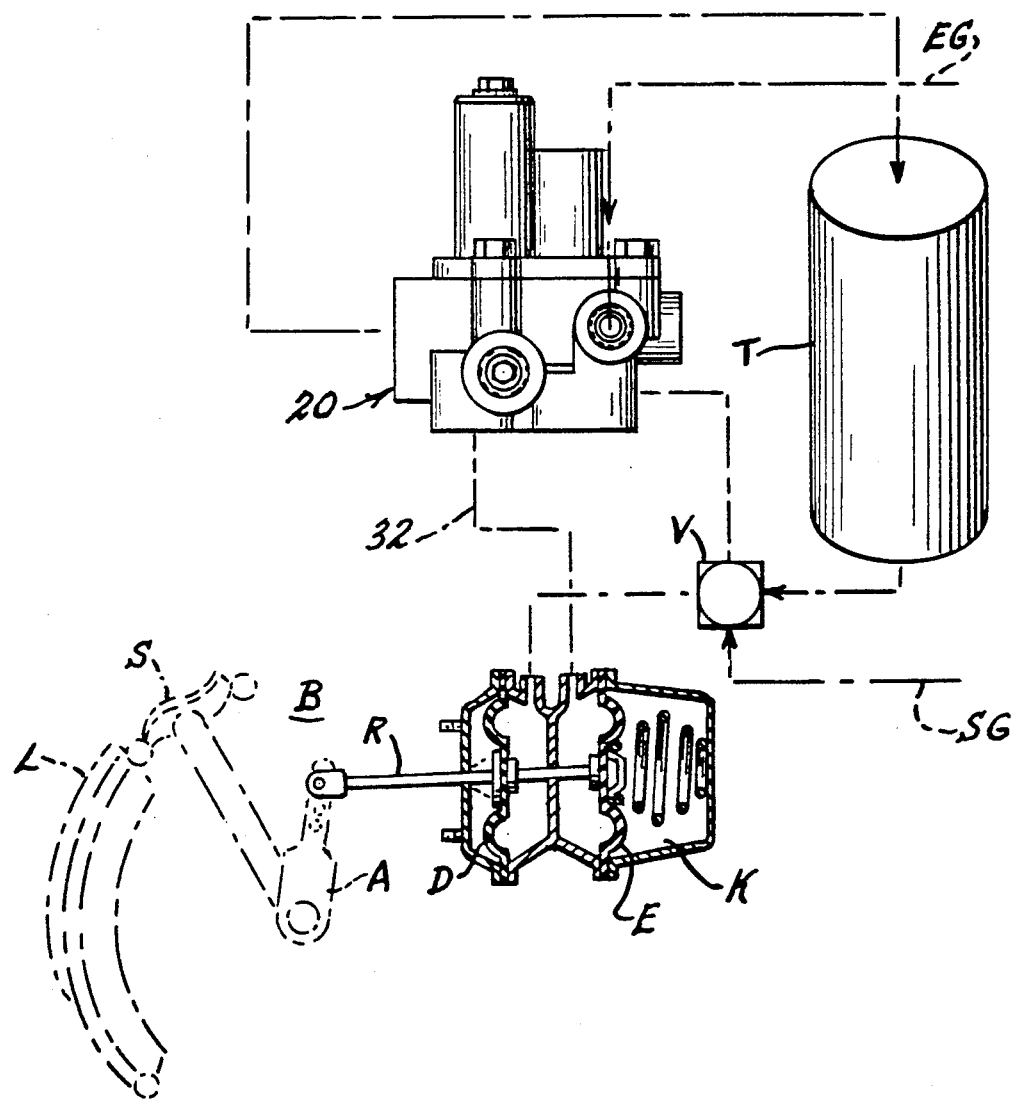
FIG. 1 is a schematic illustrational view showing one of the control valves of the present invention in line with a single service and spring brake and wherein the reservoir tank is shown connected in dotted line with the control valve and the brake system which receives pressure from an emergency gladhand line and a service gladhand line.

With reference to the drawings, FIG. 1 shows a schematic of a brake assembly B for a trailer axle, including a brake lining L, operated by an s-cam S through a slack adjuster A. The brake is applied by a push rod R driven either by a spring brake K or by a service brake diaphragm D. The spring brake is normally held in an "OFF" position by air pressure applied against the spring brake diaphragm E, which pressure is received from an integrated control valve 20 of the present invention through a supply line 32. The service brake, including the diaphragm D, is activated by compressed air received through a relay valve V which receives such compressed air either through a reservoir tank T or through the brake service lines from gladhand SG. The integrated control valve 20 is also supplied with air through the emergency supply lines from gladhand EG.

The present invention is directed to an integrated valve housing 20 which contains three valve clusters which serve to: control pressure to and within the spring brakes; fill and protect the pressure in the air reservoir tank; and prevent compounding of service and spring braking by releasing service air to atmosphere whenever, in an emergency or parking situation when no supply line pressure is available through the emergency gladhand, the spring brakes are applied.

Figure 2:
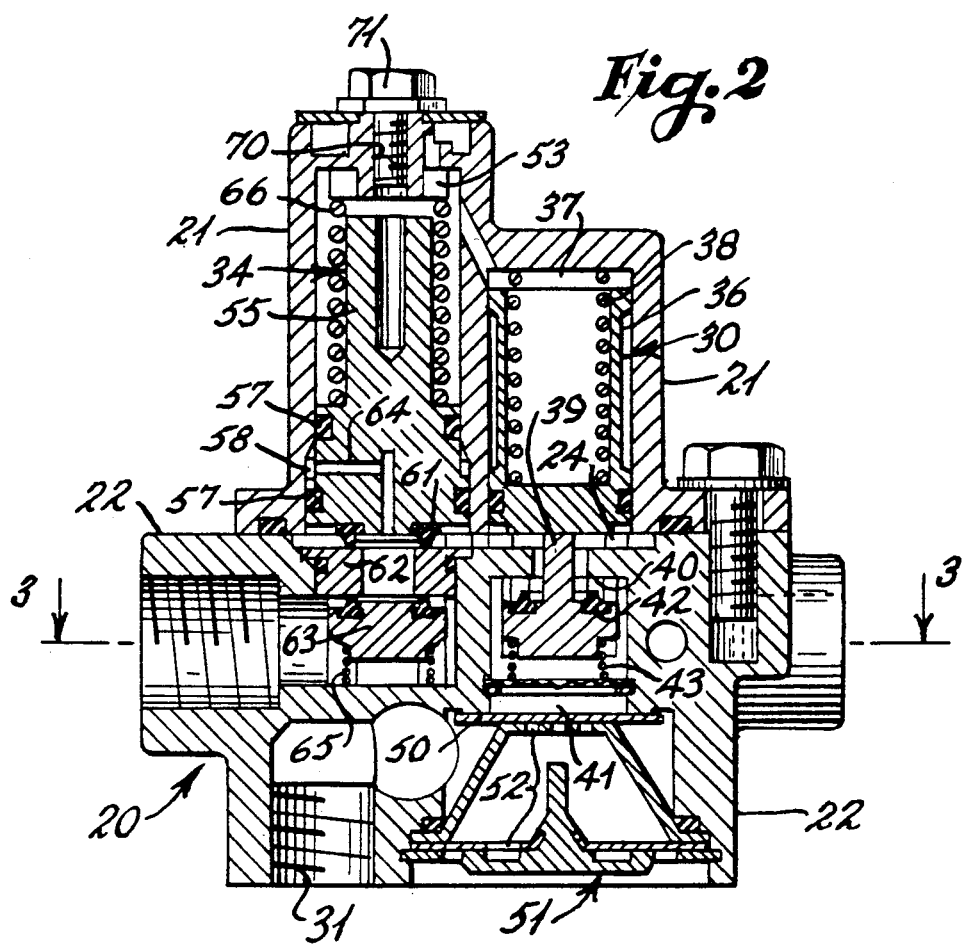
FIG. 2 is a cross-sectional view taken through a first control valve of the present invention showing two of the three valve clusters incorporated within the valve housing.

FIG. 2 is a cross-sectional view taken through the control valve 20 shown in FIG. 1. The control valve assembly includes upper and lower housing sections 21 and 22 which are assembled by means of bolts 23 so as to form a supply air passageway 24 therebetween which is sealed by an O-ring. When the braking system is initially depressurized and the tractor compressor activated, the air pressure within the emergency gladhand EG will be conveyed to a supply port 26 within the lower housing of the control valve 20. The port 26 communicates through passageways 27 and 28 and a vertical passageway 29 with air chamber or passageway 24 so that a continuous supply of compressed air is introduced through a first valve cluster 30 to the spring brake supply ports 31 which are connected through supply lines 32 to the diaphragm E of the spring brakes K to thereby urge the spring brake into an "OFF" position. As previously discussed, the control valve of the present invention is designed to ensure that supply air from the emergency gladhand is continuously made available to the spring brakes to retain them in an "OFF" position until such time as a predetermined minimum or threshold pressure of 75 (±5) psi is achieved within the spring brakes. DOT regulations require a minimum of 70 psi. Thereafter, the second valve cluster 34 of the present invention will open allowing pressure to be delivered through the control valve simultaneously to the spring brakes and to the reservoir tank T through reservoir outlet 35.

Figure 3:
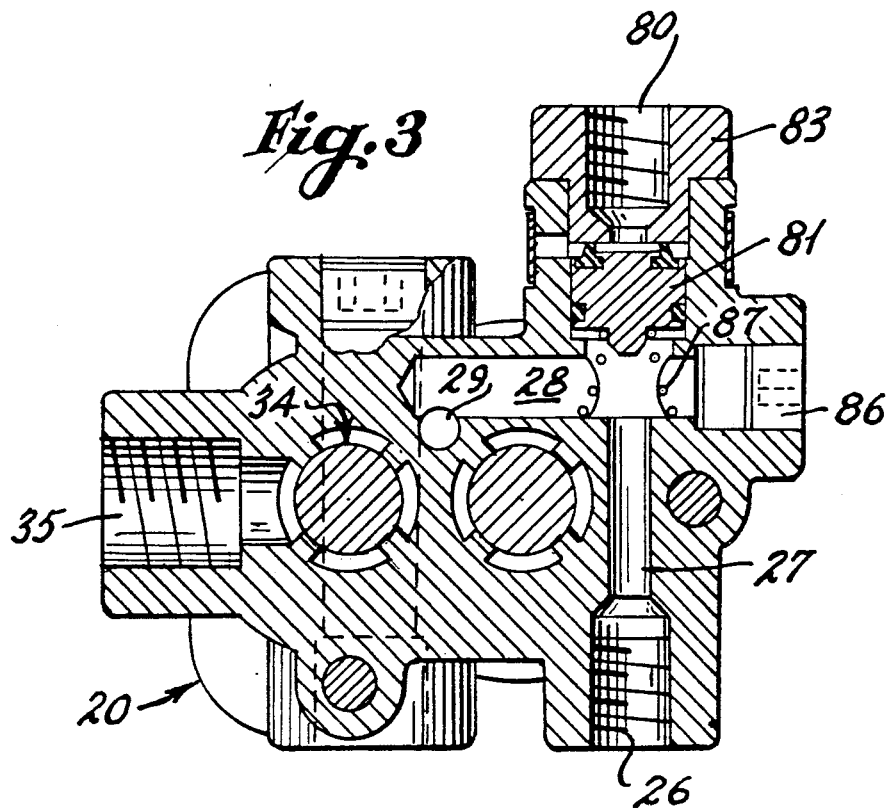
FIG. 3 is a cross-sectional view taken along lines 3—3 of FIG. 2 showing the third valve cluster incorporated within the control valve housing of FIG. 2.

With continued reference to FIGS. 2 and 3, the first valve cluster 30, which controls the passage of compressed air from the emergency gladhand supply line to the spring air brakes through either two or four ports 31 associated with each control valve, includes an emergency shuttle or piston 36 mounted within a chamber 37, formed in the upper portion 21 of the housing. The shuttle 36 is continuously urged by a spring 38 against an emergency valve or supply valve 39 which is moveable with respect to a valve seat 40 which controls the passageway 41 to the spring brake supply ports 31. The valve seat 40 is formed within the lower housing 22 with the valve 39 being sealed by an annular O-ring 42 when in a "raised" position with respect to the position shown in FIG. 2 of the drawings. The valve 39 is resiliently urged towards a closed position by valve spring 43. It should be noted that the valve 39 is designed to close with the O-ring 42 seated against the valve seat 40 after there occurs a drop in the maximum air pressure established within the emergency supply line. Normally, the maximum pressure in the system will be approximately 125 psi. Once the valve is closed, it will remain closed until such time as the pressure within the supply system drops to a predetermined spring brake isolation pressure, such as 45 psi. In this manner, maximum pressure is normally maintained within the spring brakes to retain them in an "OFF" condition regardless of fluctuations in the air pressure supply. The shuttle 36, urged by the spring 38, will force the valve 39 into an "open" position when the pressure reaches approximately 45 psi, thereby allowing the valve chamber 41 to vent into the passageway 24, thus opening a flap valve 50 associated with an emergency exhaust valve 51. During pressurization of the air brakes, the flap valve 50 will allow pressurized air to enter into the supply ports 31. However, once an operating pressure such as 125 psi has been established and the pressure in the supply line begins to drop, valve 39 closes and the pressure is equalized on either side of the flap valve. During depressurization of the emergency gladhand supply line, once pressure has dropped below the spring brake isolation pressure, such as 45 psi, the shuttle 36 will open valve 39 and thus allow the pressure within the spring brakes to open flap valve 50 and discharge through the openings 52 in the exhaust port 51. The exhaust port is designed to permit exhaustion of all four brakes (when applicable) to be exhausted therethrough within the period of time designated under DOT regulations (several seconds). The exhausting of the spring brake air pressure will automatically allow the spring brakes to be applied thereby operating the brakes B.

As previously discussed, once the pressure within the air brakes achieves a threshold level of approximately 75 psi, thereby releasing the spring brakes for allowing movement of the vehicle, pressure is allowed to be supplied simultaneously to the reservoir tank T through control of valve cluster 34 and to the spring brakes through valve cluster 30. The valve cluster 34 is mounted within a chamber 53. The second valve cluster or reservoir tank control cluster 34 includes a piston or shuttle 55 having an upper surface area oriented into the chamber 53 and which is sealed with respect to the lower surface of the shuttle by a pair of O-rings 57. The lower portion of the chamber 53 is enlarged so as to slidingly receive an outwardly extending intermediate counter balancing flange 58 defined inwardly of the lower face of the shuttle. The lower face of the shuttle supports a valve seal 61. The seal 61 is selectively seated against valve seat 62, having an opening therein which communicates with the reservoir supply port 35 through a one-way supply or check valve 63. The front face of the shuttle is in open communication through a bleed port 64 with the counter balancing flange 58 within the chamber 53. The one-way valve 63 is normally urged into a sealed relationship with respect to valve seat 62 by a spring element 65. The shuttle is urged towards a closed portion with the valve seat 62 by a spring 66. The spring 66 is designed to prevent the opening of the shuttle by the raising of the shuttle within the chamber 53 until such time as the pressure within the spring brake system, and therefore within passageway or chamber 24, reaches the minimum threshold spring brake pressure of at least 75 ($\pm$5) psi.

Under normal circumstances, hysteresis is created in the opening and closing of the shuttle 55 by pressures developed in the spring biased system. By providing the port 64, which communicates the flange 58 with the lower face of the shuttle, the flange is exposed to the supply line pressure as soon as the shuttle is raised from valve seat 62. It should be noted that an increased area of the shuttle (the flange 56) is now exposed to supply line pressure from passageway 24. When the shuttle 55 is raised, the force of the spring 66, which had been adequate to seat the shuttle in a closed position, is inadequate to close the valve, however at the same time a countering pressure is created due to the opposing surface area created by flange portion of the valve. This step or increase in the diameter of the shuttle provides a countering force to assist the spring 66 in reseating the valve shuttle 55 when the supply line pressure begins falling.

Also associated with the second valve cluster is an access opening 70 which is provided through the upper portion of the housing 21 and which is normally closed by a seal or threaded closure 71. With reference to FIG. 4 of the drawings, the upper portion of the valve housing may include a supplemental support chamber 72 into which a mechanical device such as a thumb screw 73, as shown in FIG. 5, may be selectively inserted. When there has been a disruption in the supply of air to a trailer, the air pressure which has been employed to release the emergency brake system is lost and the brakes are automatically applied by spring pressure. In order to move the vehicle, the spring brakes must be released by applying pressure to the diaphragm E associated with each spring brake thereby collapsing the springs therein or by mechanical caging of the spring, and releasing the spring brakes K to permit emergency towing or moving of the vehicle. In this embodiment, and as shown in FIG. 6, the protective cover or closure 71 is removed from the housing opening 70. Thereafter, the thumb screw or other mechanical device 73 is threaded therein until such time as the shank 74 of thumb screw engages the upper portion of the shuttle 55 and urges the shuttle into a closed position whereby the seal 61 is seated against valve seat 62. In this position, the shuttle 55 has closed the passageway to the reservoir tank through reservoir outlet 35. Thereafter, the defective emergency supply line may be disconnected from the inlet port 26 and an external source of air, such as from a towing vehicle, may be attached thereto so as to supply a source of compressed gas directly to the spring brakes as has been discussed hereinabove. Also, the check valve 63 will retain the reservoir pressure when the supply pressure is removed from the passageway or chamber 24.

With specific reference to FIG. 3 of the drawings, the control valve 20 of the present invention also is designed to prevent compounding of brake pressure in a situation wherein the spring brakes have been applied. As previously discussed, a problem can occur in a situation where trailers are connected in tandem and, after being parked, an operator connects the air line to the trailers, turns on the service connection to the second trailer but connects and fails to turn on the supply line to the second trailer. Thereafter, if the operator subsequently releases the spring brakes but is required to keep the vehicle with the service brakes applied for a period of time, with current practice it is possible that the service air being applied would charge the reservoir to the same extent that pressure is being applied to the brake pedal by the operator. A slight buildup of air pressure might be adequate to partially release the spring brakes to a degree that some vehicle movement could be allowed thereby creating a situation where wear on the brake linings or even a fire may be created.

In the present invention, an anti- or non-compounding of service and spring brakes is accomplished by exhausting the service brake line to atmosphere whenever the spring brakes are applied. As shown in FIG. 3, the service line is connected to control valve 20 through port 80 so a to apply pressure against a slide valve 81 mounted within a chamber 82. The outer face of the valve 81 is acted upon by a spring 87 which normally urges the valve 81 against a valve seat 83 surrounding the service inlet port 80. An O-ring 84 ensures a tight sealing of the valve 81 and the valve seat 83. Under normal operation when emergency supply air is available through port 26, the air will act on the outer face 82 of the valve 81 thereby urging the valve into a closed relationship with valve seat 83. However, should the supply line pressure be interrupted, pressure from the service line at port 80 will act to urge the valve 81 against the spring 82. At this point, the service port 80 will directly communicate through an outlet valve 85 provided between the inner face of the valve 81 and the valve seat 83, thus permitting an immediate exhausting of the service line pressure to atmosphere and preventing any possible buildup of pressure in the service line. It should also be noted in FIG. 3, that in instances where tandem trailers are to be utilized, a supply line connection is effected through a normally closed port 86 so that communication from the emergency gladhand through the inlet port 26 could be connected through a supplemental supply line connected at the port 86 to the following vehicle.

Figure 7:
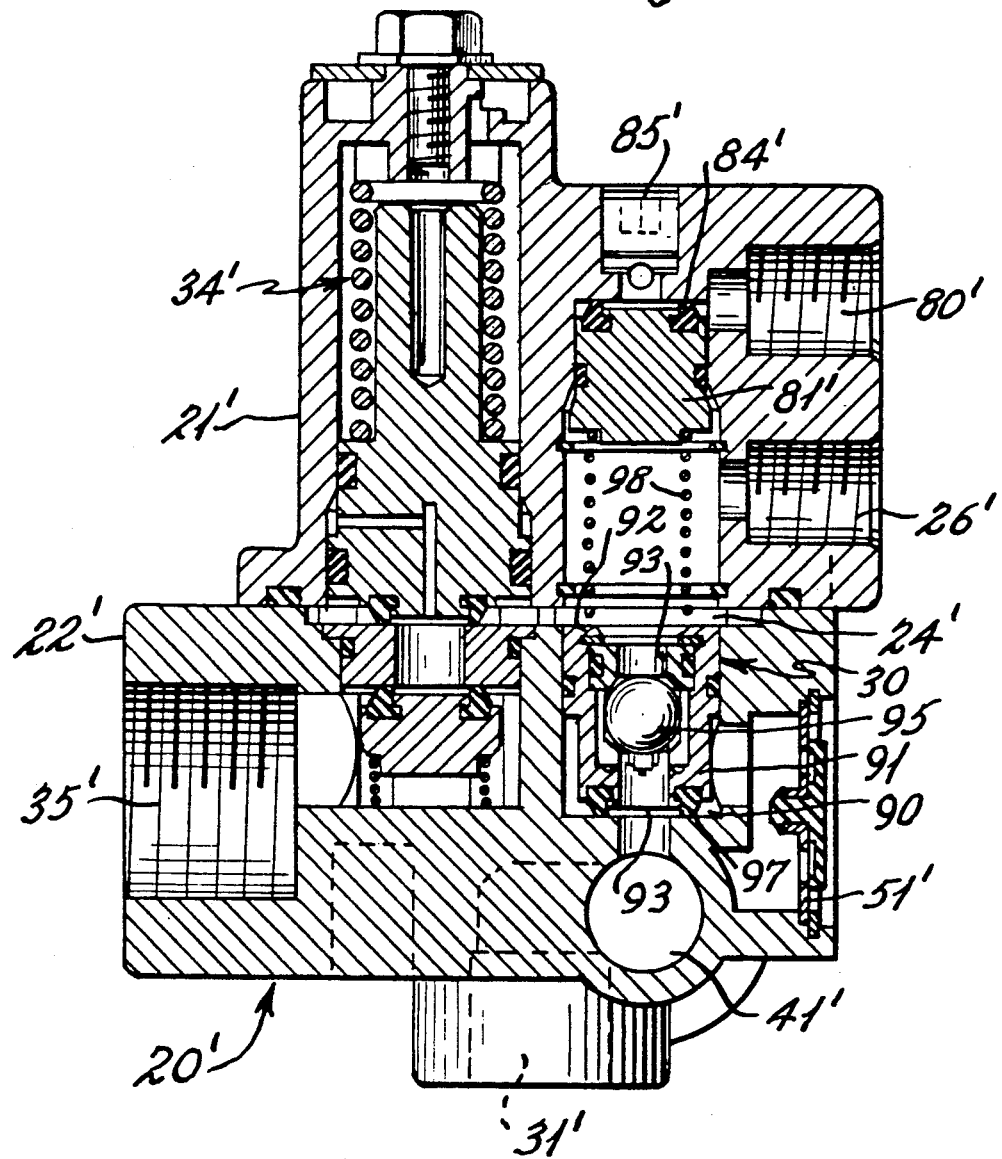
FIG. 7 is a cross-sectional view taken through a second embodiment of control valve in accordance with the teachings of the present invention and incorporating three valve clusters.

With continued reference to FIG. 7, a modified control valve 20' is disclosed which is designed to be more compact than the emergency braking control valve previously discussed. However, the control valve 20' includes each of the valve clusters which were associated with the embodiment disclosed in FIGS. 2 and 3. More specifically, the control valve 20' includes upper and lower housing sections 21' and 22' which are assembled by bolts (not shown) in a manner similar to the housing members of the embodiment disclosed in FIGS. 2 and 3, so as to create an air chamber 24' therebetween. Unlike the embodiment of FIGS. 2 and 3, however, in this embodiment, the emergency supply inlet 26' is formed in the upper housing 21' so as to be in direct communication with the chamber 24'. In a like manner, the service port 80' is also formed in the upper housing 21' The reservoir tank supply port 35' remains disposed within the lower housing as are the spring brake supply ports 31'.

Unlike the previous embodiment, the first or spring brake valve cluster 30' is fully seated within a cavity 90 which is in communication with an air chamber 41' which communicates with the air brake supply ports 31' and an exhaust chamber which communicates with a spring brake exhaust valve 51'. As with the previous embodiment, the first valve cluster functions to ensure that emergency supply air is made continuously available to the air brakes until such time as the system reaches its maximum operating pressure or 125 psi. The second valve cluster 34' will ensure that no supply air is made available to the reservoir tank until such time as the pressure within the air brakes reaches the minimum brake threshold of 75 (±5) psi. The operation of the second cluster valve 34' will not be discussed in any greater detail as the components including the slide valve, valve seal and one-way reservoir valve remain the same as they were in the previous embodiment.

In the present embodiment, the first valve cluster 30' for controlling supply air to the air brakes includes an outer slide housing 91, having an upper face 92 and lower face 93. A flow channel is created through the housing and is selectively sealed by a check valve 95 which is operably seated against a valve seat 93 provided adjacent the upper portion of the slide housing. A lower valve seal 97 is provided adjacent the lower face of the slide housing and serves to seal the spring brake air chamber 41' and spring brake supply ports 31' from the exhaust valve 51'.

In the previous embodiment, the first valve cluster for controlling supply air to the spring brakes utilized a calibrated spring 38 to force the shuttle valve 36 relative to the check valve 39. In the present embodiment, the spring biased action of the valve assembly has been replaced by the slide housing and check valve assembly which utilizes a differential surface area between the upper and lower portions of the slide valve to create a differential force on either side of the valve to control the opening and closing of the valve relative to the exhaust port 51'. In this embodiment, the area defined by the upper portion of the slide housing 91, the valve seat 96 and the upper surface of the check valve 95 is greater than the active area on the spring brake passage side 41' or the lower surface of the slide housing 91 defined within the lower valve seal 97. In this manner, during normal supply line operation, supply pressure will force the check valve 95 away from the valve seat 93 allowing the pressure supply to enter the spring brake supply ports 31'.

Once the system has reached its maximum operating pressure of approximately 125 psi, any decrease in the supply line pressure will cause the check valve 95 to seal against the seat 93 thereby ensuring that a maximum spring brake pressure is provided within chamber 41' and at the supply ports 31'. The check valve 95 will remain closed until such time as the supply line pressure within chamber 24' drops sufficiently to be overcome by the high pressure applied to the smaller area exposed to the pressure of the spring brakes adjacent passage 41'. The areas of the upper and lower portion of the slide housing are sized so that the slide housing 91 will be lifted thereby raising the seal 97 from its seated position and opening the chamber 41' to the exhaust port 51' when the supply pressure drops to the spring brake isolation pressure of approximately 45 psi. With this valve, the control of the spring brake pressure is dependent upon the supply line pressure and not upon a calibrated spring. The spring shown in the drawings at 98 is merely used to urge the valve housing to quicken its travel to a seated position in response to supply pressure being applied through the supply port 26'. When the pressure within the supply chamber 24' falls below 45 psi, the high pressure within the spring brake chamber 41' will be sufficient to urge the housing 91 upwardly opening the chamber to the exhaust valve 51' thereby allowing an immediate exhausting of the high pressure air within the spring brakes. The exhaust valve 51' is designed to permit a substantially immediate exhausting of the spring brake air pressure when pressures fall below the spring brake isolation pressure to thereby allow the immediate application of the spring brakes in response to loss of supply line pressure.

The control valve 20' also includes an anti-compounding valve assembly 82' which is utilized to ensure that any service air or pressure is exhausted to atmosphere during a period of time in which the spring brakes are applied following loss of supply line pressure to thereby prevent a compounding of pressures which could develop, such as a partial buildup of pressure in the reservoir tank, at a time in which the spring brakes are applied, by operation of the service pedal. In this embodiment, the service port 80' and supply port 26' are opposed with one another by way of slide valve or piston 81' which is seated by valve seal 84' against an exhaust port 85'. The valve 81' is normally urged into a seated engagement with the exhaust valve 85' by means of the spring element 98. The valve 81' includes an upper face defining a first surface area and a lower face defining a second surface area which is greater than that of the first face. In this manner, the differential areas exposed to the pressures from the service port 80' and the supply port 26' are caused to retain the valve 81' seated until such time as the supply line pressure is removed and spring brakes automatically applied due to loss of supply pressure. In this manner, as soon as the spring brake chamber 41' is exhausted through exhaust port 51', the valve 81' will open away from the exhaust port 85' allowing an immediate exhausting of the service port 81' to atmosphere and preventing any application of service pressure to the relay valve V and thus preventing compounding of pressure applications to the brakes through the service brakes at the same time that the spring brakes are applied.

Figure 8:
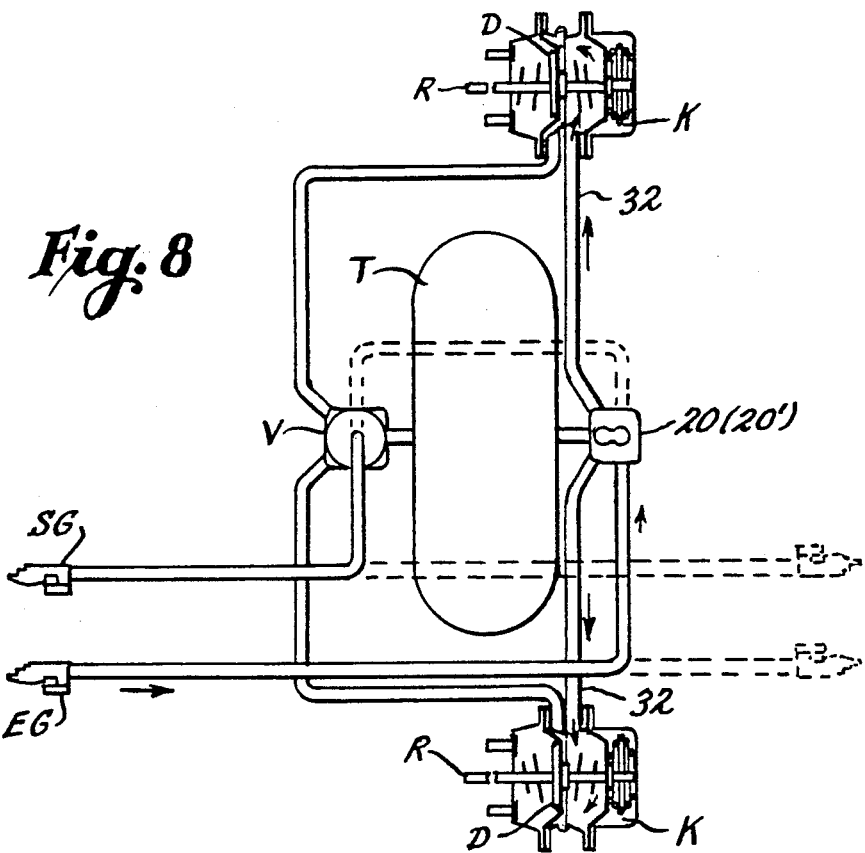
FIG. 8 is a flow diagram showing the flow of emergency supply air through the emergency gladhand and to the pressure chambers of a pair of spring brakes through the control valve assembly between operating pressures from 0 to the minimum spring brake threshold pressure.

With continued reference to FIGS. 8–12, the operation of the control valves 20 and 20' of the present invention as they relate to a pair of service and spring brakes located on a vehicle axle will be disclosed in greater detail. FIG. 8 reflects the flow of compressed air from a tractor's compressor through the emergency gladhand supply line, the control valve 20 (20'), to the spring brakes K during the initial charging of the emergency system so that the spring breaks are rapidly released initially upon the supplying of compressed air to the system. As previously discussed, the control valve assembly will ensure that until a minimum predetermined or minimum threshold pressure, such as 75 ($\pm 5$) psi, has been reached, that all flow of compressed gas will be to the spring brakes, as is shown by the arrows in FIG. 8.

Figure 9:
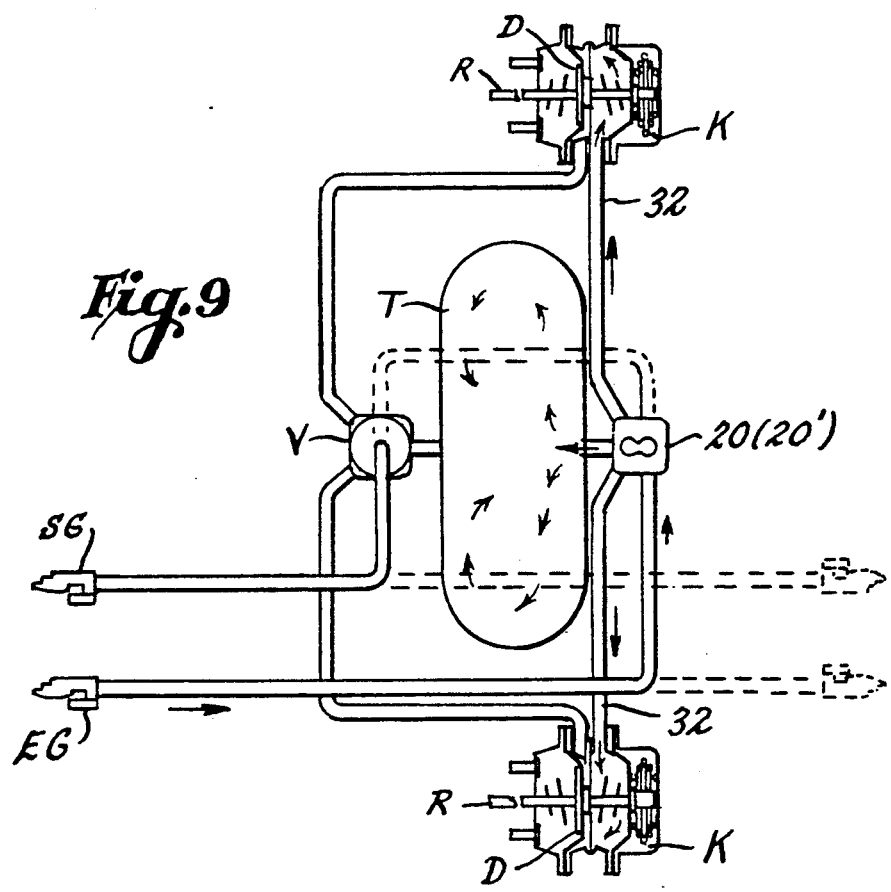
FIG. 9 is a flow diagram showing the flow of air to the spring brakes and to the reservoir tank of the braking system at pressures above the minimum spring brake threshold pressure.

Once the pressure within the emergency supply system has reached the minimum spring brake threshold, the second valve cluster 34 (34') of the control valve assembly will open, thereby allowing a simultaneous charging of the reservoir tank T and the spring brakes K, as shown in FIG. 9. The first valve clusters 30 (30') will remain open allowing the charging of the spring brakes with compressed air from the emergency supply line until such time as the system reaches its maximum operating pressure, which may be 125 psi.

Figure 10:
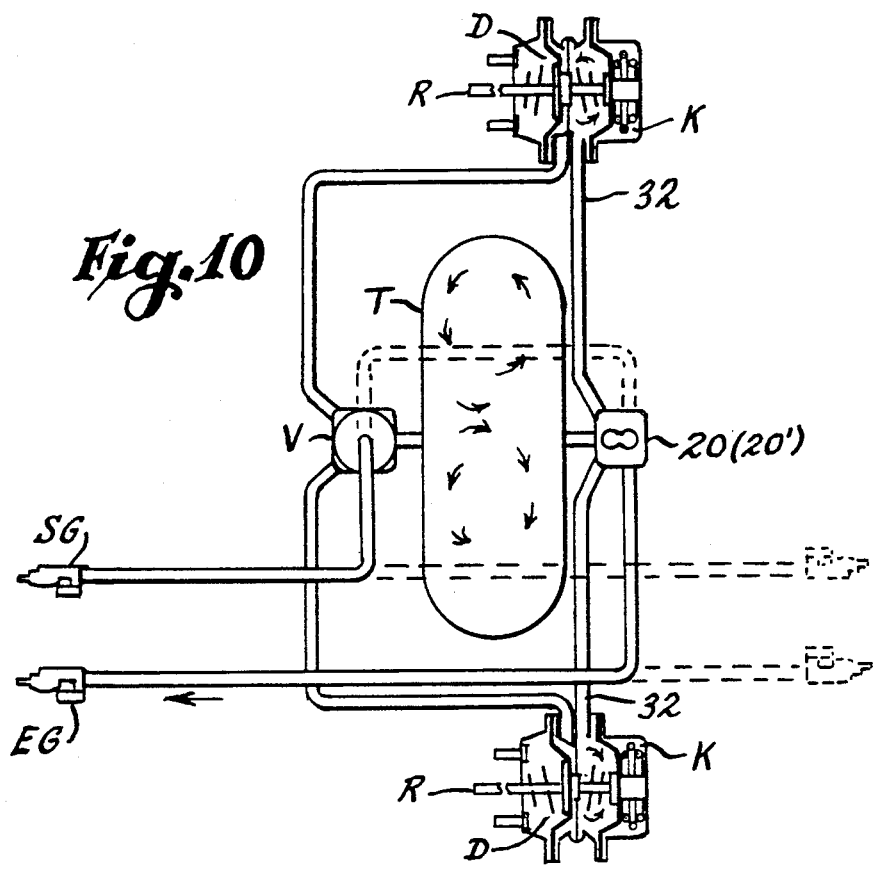
FIG. 10 is a flow diagram with regard to the braking system showing the closing of the emergency gladhand supply line to the pressure chamber of the spring brakes at pressures falling below the maximum pressure achieved in the supply line.
Figure 11:
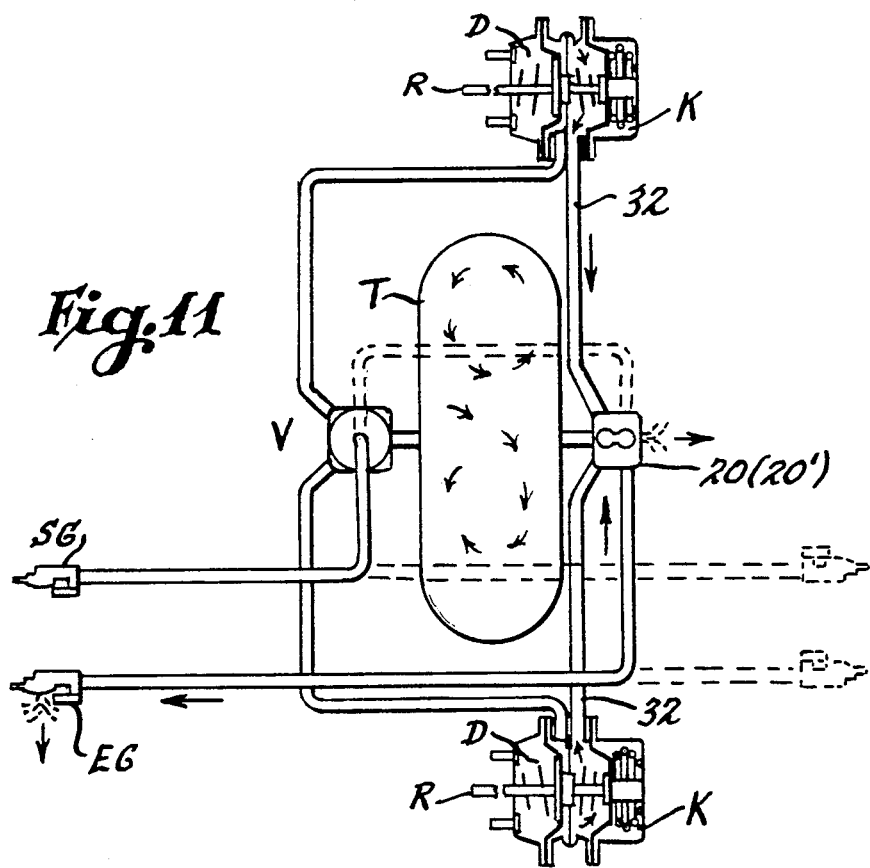
FIG. 11 is a flow diagram showing the flow of air pressure from the spring brakes as they are exhausted to atmosphere immediately upon the pressure within the supply line dropping below the isolation spring brake pressure at which point the spring brakes are automatically applied.

With reference to FIG. 10, once the pressure in the supply drops below the maximum operating pressure, the first valve cluster 30 will close the spring brake chamber 41 (41') to thereby retain the maximum pressure within the spring brakes. With respect to FIG. 11, as the pressure drops to the spring brake threshold pressure of 45 psi, the first valve cluster for controlling the spring brake cluster will open, thereby allowing the spring brakes to exhaust through the exhaust ports 51 (51') and causing the immediate application of the spring brakes.

As shown in FIG. 12, upon the application of the spring brakes and in order to avoid anti-compounding of forces in the braking system, once the pressure has dropped below the isolation pressure or 45 psi, the third valve cluster 81 and 81' will open allowing the service signal to be immediately exhausted to atmosphere through exhaust valve 85' and thus prevent any additional buildup of air within the service brakes, the supply reservoir, or spring brakes.

I claim:

1. A vehicle brake system having brake means including spring brakes having actuator means which is compressor air operated to hold the spring brakes "OFF" and including service brakes operative above a minimum service brake pressure to apply the service brakes and the system including, a reservoir tank, an emergency supply line through which supply air is supplied to the spring brakes, a brake control valve means comprising:
   a) a housing having a service brake input port and an emergency supply inlet port, at least two spring brake ports, a reservoir tank outlet port, and a spring brake exhaust port;
   b) a first valve cluster mounted within said housing intermediate said supply inlet port and said spring brake ports, said first valve cluster being operable to open said spring brake ports to said supply inlet port immediately upon the application of supply pressure to said supply inlet port and until a maximum supply pressure is achieved at said supply inlet port, said first valve cluster being operable to close said spring brake ports from said supply inlet port upon a subsequent decrease in supply air pressure at said supply inlet port from said maximum supply pressure to thereby retain the spring brakes in an "OFF" position until such time as said supply line pressure at said supply inlet port drops below a predetermined spring brake isolation pressure below which said first valve cluster opens to communicate said spring brake ports to said spring brake exhaust port and thereby allowing the spring brakes to be "ON";
   c) a second valve cluster mounted within said housing and intermediate said supply inlet port and said reservoir tank outlet port, said second valve cluster including a shuttle means for sealing said reservoir outlet port from said supply inlet port until the supply pressure at said supply inlet port is above a threshold pressure for said spring brakes which is below said maximum pressure, said shuttle means opening at pressures above said threshold pressure to thereby allow said supply air pressure to be applied to said reservoir outlet port; and
   d) a third valve cluster mounted between said supply inlet port and said service inlet port, said third valve cluster being operable to discharge said service inlet port to atmosphere upon the supply air pressure at said supply inlet port falling below said spring brake isolation pressure to thereby prevent compounding of service brake pressure in the braking system when the spring brakes are "ON".

2. The braking system of claim 1 in which said second valve cluster includes a chamber in which said shuttle is reciprocally retained, said chamber having upper and lower portions, said lower portion being greater in diameter than said upper portion, said shuttle including a lower face and an upper portion and a flange portion spaced from said lower face and oriented within said lower portion of said chamber, a bleed port defining an opening between said lower face and said flange, a valve seat in opposing relationship to said lower face of said shuttle, spring means normally urging said shuttle toward a sealed engagement with said valve seat at pressures below said threshold spring brake pressure, said bleed port allowing supply pressure to be applied against said flange in opposition to the supply pressure applied to said lower face of said shuttle when said shuttle is raised from said valve seat at supply air pressure above said threshold spring brake pressure.

3. The braking system of claim 2 including an opening into said upper portion of said chamber, said opening being aligned with said shuttle and means extendable through said opening and into contact with said upper portion of said shuttle to thereby urge and retain said shuttle in sealed engagement with said valve seat.

4. The braking system of claim 3 in which said housing includes a supplemental chamber, said means extendable though said opening including a screw means, said screw means being normally retained within said supplemental chamber.

5. The braking system of claim 2 in which said third valve cluster includes a piston having one end exposed to said supply inlet port and a second end exposed to said service inlet port, said second end including a valve seal which normally is seated with respect to said service inlet port, said service inlet port being exposed to a smaller surface area defined by said second end of said piston than the surface area of said one end of said piston exposed to said supply inlet port, and exhaust valve means mounted intermediate said service inlet port and said piston, said service inlet port being in open communication with said exhaust valve means when the supply pressure within said housing falls below said spring brake isolation pressure to thereby discharge said service inlet port to atmosphere.

6. The braking system of claim 1 in which said third valve cluster includes a piston having one end exposed to said supply inlet port and a second end exposed to said service inlet port, said second end including a valve seal which normally is seated with respect to said service inlet port, said service inlet port being exposed to a smaller surface area along said second end of said piston than the surface area of said one end of said piston exposed to said supply inlet port, and exhaust valve means mounted intermediate said service inlet port and said piston, said service inlet port being in open communication with said exhaust valve means when the supply pressure within said housing falls below said spring brake isolation pressure to thereby discharge said service inlet port to atmosphere.

7. The braking system of claim 1 in which said first valve cluster includes a shuttle housing disposed within a chamber so as to be moveable therein, said shuttle housing having upper and lower surface portions, a channel defined through said shuttle housing, a first valve seat spaced inwardly from said upper surface of said shuttle housing and a second valve seal extending from said lower surface of said shuttle housing, said second valve seal normally sealing said supply inlet port and said spring brake ports from said spring brake exhaust valve, a check valve mounted within said channel through said shuttle housing, said check valve being operable to seat against said first valve seat when pressures fall below said maximum supply line pressure to thereby retain said maximum pressure at said spring brake ports, the upper surface of said shuttle housing exposed to said inlet supply port being of greater surface area than the lower surface of said shuttle housing exposed to said maximum pressure in said spring brake ports, said relative surface areas of said upper and lower surfaces of said shuttle housing being such as to allow said shuttle housing to move within said chamber to thereby open said shuttle housing to permit pressure within said air brake outlets to be exhausted through said air brake exhaust valve when pressures fall below said isolation pressure of said spring brake ports.

8. The braking system of claim 7 in which said third valve cluster includes a piston slideably mounted within a chamber in general alignment with said chamber in which said shuttle housing of said first valve cluster is retained and on opposite sides of said inlet supply port, said piston having an upper surface area exposed to said service inlet and a lower surface area exposed to said supply inlet port, said lower surface area being greater than said upper surface area, a valve seal carried by said upper surface area of said piston and normally sealing a service exhaust outlet, said relative surface areas of said upper and lower surfaces of said piston being such as to cause said piston to open relative to said service exhaust outlet when the pressure within said supply inlet port falls below said spring brake isolation pressure to thereby allow said service inlet port to exhaust through said service exhaust port when the spring brakes are "ON".

9. The braking system of clam 1 in which said second valve cluster includes a check valve, said check valve being operable to close said reservoir outlet port to retain pressure within said reservoir tank when the supply pressure is removed at said supply inlet port.

10. A vehicle brake system having brake means including spring brakes having actuator means which is compressor air operated to hold the spring brakes "OFF" and including service brakes operative above a minimum service brake pressure to apply the service brakes and the system including an emergency supply line through which supply air is supplied to the spring brakes, a brake control valve means comprising:

a) a housing having an emergency supply inlet port, at least two spring brake ports, a reservoir tank outlet port, and a spring brake exhaust port;

b) a first valve cluster mounted within said housing intermediate said supply inlet port and said spring brake ports, said first valve cluster being operable to open said spring brake ports to said supply inlet port immediately upon the application of supply pressure to said supply inlet port;

c) a second valve cluster mounted within said housing and intermediate said supply inlet port and said reservoir tank outlet port, said second valve cluster including a shuttle means for sealing said reservoir outlet port from said supply inlet port until the supply pressure at said supply inlet port is above a threshold pressure for said spring brakes, said second valve cluster including a chamber in which said shuttle is reciprocally retained, said chamber having upper and lower portions, said shuttle including a lower face and an upper portion and a valve seat in opposing relationship to said lower face of said shuttle; and d) an opening into said upper portion of said chamber, said opening being aligned with said shuttle and means extendable through said opening and into contact with said upper portion of said shuttle to thereby urge and retain said shuttle in sealed engagement with said valve seat.

11. The braking system of claim 9 in which said housing includes a supplemental chamber, said means extendable though said opening including a screw means, said screw means being normally retained within said supplemental chamber.

* * * * *